(12) United States Patent
Kim et al.

(10) Patent No.: US 12,444,241 B2
(45) Date of Patent: Oct. 14, 2025

(54) ANOMALY DETECTION MODEL USING MESSAGE ID SEQUENCE ON UNMANNED MOVING OBJECTS

(71) Applicant: Korea University Research and Business Foundation, Seoul (KR)

(72) Inventors: Huy Kang Kim, Seoul (KR); Jeong Do Yoo, Seoul (KR); Seonghoon Jeong, Seoul (KR); Eunji Park, Seoul (KR); Kang Uk Seo, Seoul (KR); Minsoo Ryu, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 293 days.

(21) Appl. No.: 17/532,272

(22) Filed: Nov. 22, 2021

(65) Prior Publication Data

US 2022/0165101 A1    May 26, 2022

(30) Foreign Application Priority Data

Nov. 24, 2020   (KR) .................. 10-2020-0158745
Jan. 19, 2021   (KR) .................. 10-2021-0007599

(51) Int. Cl.
*G07C 5/00*   (2006.01)
*G06N 3/08*   (2023.01)
*G07C 5/08*   (2006.01)

(52) U.S. Cl.
CPC .............. *G07C 5/008* (2013.01); *G06N 3/08* (2013.01); *G07C 5/0808* (2013.01)

(58) Field of Classification Search
CPC ........ G07C 5/008; G07C 5/0808; G06N 3/08; G06N 3/044; G06N 3/045; G06N 3/084; H04L 63/1425
See application file for complete search history.

(56) References Cited

U.S. PATENT DOCUMENTS

| 2009/0195401 | A1* | 8/2009 | Andrew ............. G06V 20/52 |
| 2019/0228312 | A1* | 7/2019 | Sari ................. G06F 17/18 |
| 2019/0260768 | A1  | 8/2019 | Mestha et al. |
| 2020/0167640 | A1  | 5/2020 | Sundareswara et al. |

FOREIGN PATENT DOCUMENTS

| JP | 2018-147172 A | 9/2018 |
| JP | 2020-104839 A | 7/2020 |
| KR | 10-2020-0054374 A | 9/2020 |

OTHER PUBLICATIONS

Korean Office Action issued on Jun. 3, 2022 in counterpart Korean Patent Application No. 10-2021-0007599 (4 pages in Korean).

* cited by examiner

*Primary Examiner* — Rachid Bendidi
*Assistant Examiner* — Kirsten Jade M Santos
(74) *Attorney, Agent, or Firm* — NSIP Law

(57) ABSTRACT

Disclosed is a method of detecting anomaly of an unmanned moving object by using a message ID sequence, and the method includes: collecting packet data generated in the unmanned moving object; pre-processing the collected packet data; and detecting an anomaly of the unmanned moving object based on a message ID pattern of the packet data by inputting the pre-processed packet data to a pre-trained neural network model.

19 Claims, 8 Drawing Sheets

ANOMALY DETECTION MODEL USING MESSAGE ID SEQUENCE ON UNMANNED MOVING OBJECTS

CROSS-REFERENCE TO RELATED APPLICATIONS

This application claims priority to and the benefit of Korean Patent Application No. 10-2020-0158745 filed on Nov. 24, 2020 and Korean Patent Application No. 10-2021-0007599 filed on Jan. 19, 2021 in the Korean Intellectual Property Office, the entire contents of which are incorporated herein by reference.

TECHNICAL FIELD

The present disclosure relates to a method of detecting an anomaly of an unmanned moving object, and more particularly, to a method of detecting an anomaly of an unmanned moving object by using a message ID sequence.

BACKGROUND ART

In general, an unmanned moving object refers to an object, such as a drone, that performs a specific mission by being controlled, by a person, wirelessly in a remote environment, or an object, such as an autonomous vehicle, that performs a specific mission by judging the current situation by itself with minimal human intervention. Todays, as unmanned moving object technology develops, unmanned moving objects are used in various fields, such as courier service, driving, local surveillance, and military weapons.

The unmanned moving object is configured through networking of various constituent elements according to a system characteristic. The unmanned moving object recognizes an environment by using sensor data collected through a GPS, a camera, a LiDAR, and an IMU sensor, and controls or adjusts a posture and a position by using the recognized environment information. As the unmanned moving object is a collection of various hardware and software constituent elements, various risks and threats exist.

As there is little human intervention, if anomaly is detected in an unmanned moving object, there are many cases in which a human cannot immediately recognize and respond to the abnormality. Accordingly, when anomaly is detected by an anomaly detection system, it is necessary to immediately notify a person of the anomaly.

However, in the case of the existing method in which anomaly is detected by using sensor data, it is necessary to process, use, and combine the various sensor data, so that there is a limitation in that overhead is large. Accordingly, there is a demand for a new method of detecting an anomaly of an unmanned moving object by using a message ID sequence.

PRIOR ART LITERATURE

Patent Document

US Patent Application Laid-Open No. 2019/0260768 (Aug. 22, 2019) (U.S. patent application Ser. No. 15/899,903)

SUMMARY OF THE INVENTION

The present disclosure has been conceived in response to the foregoing background art, and has been made in an effect to provide a method of detecting an anomaly of an unmanned moving object which includes a deep learning framework for detecting an anomaly occurring in an unmanned moving object.

The technical objects of the present disclosure are not limited to the foregoing technical objects, and other non-mentioned technical objects will be clearly understood by those skilled in the art from the description below.

In order to solve the foregoing object, an exemplary embodiment of the present disclosure discloses a new unmanned moving object anomaly detecting model using a message ID sequence.

In order to solve the foregoing object, an exemplary embodiment of the present disclosure provides a method of detecting anomaly of an unmanned moving object, the method including: collecting packet data generated in the unmanned moving object; pre-processing the collected packet data; and detecting an anomaly of the unmanned moving object based on a message ID pattern of the packet data by inputting the pre-processed packet data to a pre-trained neural network model.

In an alternative exemplary embodiment of the method of detecting anomaly of an unmanned moving object, the collecting the packet data may include collecting the packet data generated in the unmanned moving object through communication between the unmanned moving object and a Ground Control System (GCS).

In the alternative exemplary embodiment of the method of detecting anomaly of an unmanned moving object, the pre-processing the collected packet data may include: extracting a message ID from the collected packet data; assigning an integer value to the extracted message ID; and normalizing the integer value assigned to the message ID.

In the alternative exemplary embodiment of the method of detecting anomaly of an unmanned moving object, the assigning an integer value to the extracted message ID may include assigning a different integer value according to a type of the message ID.

In the alternative exemplary embodiment of the method of detecting anomaly of an unmanned moving object, the assigning an integer value extracted to the message ID may include assigning any one integer among 1 to N to each message ID when the number of types of the message ID is a total of n.

In the alternative exemplary embodiment of the method of detecting anomaly of an unmanned moving object, the normalizing the integer value assigned to the message ID includes normalizing the integer value assigned to the message ID to a range of 0 to 1 in order to scale a size of the message ID.

In the alternative exemplary embodiment of the method of detecting anomaly of an unmanned moving object, the normalizing the integer value assigned to the message ID may include, when the number of types of the message ID is a total of n, normalizing the integer value assigned to the message ID to a result value obtained by dividing the integer value assigned to each of message ID by n.

In the alternative exemplary embodiment of the method of detecting anomaly an unmanned moving object, the detecting of the anomaly of the unmanned moving object may include: inputting the pre-processed packet data to a pre-trained neural network model; predicting a message ID following a current message ID sequence of the packet data input to the neural network model; calculating a message ID pattern prediction success rate by comparing the predicted message ID and an actual message ID; and detecting an anomaly of the unmanned moving object based on the calculated message ID pattern prediction success rate.

In the alternative exemplary embodiment of the method of detecting anomaly an unmanned moving object, the calculating of the message ID pattern prediction success rate may include: calculating an average value for message ID pattern prediction success rates for a predetermined period of time when the message ID pattern prediction success rate is calculated; and detecting the anomaly of the unmanned moving object by comparing the calculated average value for the message ID pattern prediction success rates with a predetermined threshold.

In the alternative exemplary embodiment of the method of detecting anomaly of an unmanned moving object, the detecting an anomaly of the unmanned moving object may include determining that an anomaly of the unmanned moving object is detected when the calculated average value for the message ID pattern prediction success rates is smaller than the threshold.

In the alternative exemplary embodiment of the method of detecting anomaly of an unmanned moving object, the detecting of the anomaly of the unmanned moving object may include: inputting the pre-processed packet data to a pre-trained neural network model; predicting a message ID following a current message ID sequence of the packet data input to the neural network model; calculating a message ID pattern loss value by comparing the predicted message ID and an actual message ID; and detecting an anomaly of the unmanned moving object based on the calculated message ID pattern loss value.

In the alternative exemplary embodiment of the method of detecting anomaly of an unmanned moving object, the calculating of the message ID pattern loss value may include: calculating an average value for message ID pattern loss values for a predetermined period of time when the message ID pattern loss value is calculated; and detecting the anomaly of an unmanned moving object by comparing the calculated average value for the message ID pattern loss values with a predetermined threshold.

In the alternative exemplary embodiment of a method of detecting anomaly of an unmanned moving object, the determining of an anomaly of the unmanned moving object may include detecting that the anomaly of the unmanned moving object is detected when the calculated average value for the message ID pattern loss values is larger than the threshold value.

In the alternative exemplary embodiment of the method of detecting anomaly of an unmanned moving object, pre-training of the neural network model may include: collecting normal packet data generated in a normal communication state of the unmanned moving object; pre-processing the collected normal packet data; and learning the neural network model in a way of predicting a message ID following a current message ID sequence of the normal packet data by inputting the pre-processed normal packet data to the neural network model.

In order to solve the foregoing object, another exemplary embodiment of the present disclosure discloses a non-transitory computer readable medium storing a computer program, wherein the computer program performs the following method for detecting anomaly of an unmanned moving object when executed by one or more processors, the method comprising: collecting packet data generated in the unmanned moving object; pre-processing the collected packet data; and detecting an anomaly of the unmanned moving object based on a message ID pattern of the packet data by inputting the pre-processed packet data to a pre-trained neural network model.

In order to solve the foregoing object, still another exemplary embodiment of the present disclosure discloses a computing device for providing a method of detecting an anomaly of an unmanned moving object, the computing device including: a processor including one or more cores; and a memory, in which the processor collects packet data generated in the unmanned moving object, pre-processes the collected packet data, and detect an anomaly of the unmanned moving object based on a message ID pattern of the packet data by inputting the pre-processed packet data to a pre-trained neural network model.

The present disclosure may detect anomaly of an unmanned moving object by using a message ID sequence.

The effects of the present disclosure are not limited to the foregoing effects, and other non-mentioned effects will be clearly understood by those skilled in the art from the description below.

BRIEF DESCRIPTION OF THE DRAWINGS

Some of the exemplary embodiments are illustrated in the accompanying drawings so that the features of the present disclosure mentioned above may be understood in detail with more specific description with reference to the following exemplary embodiments. Further, similar reference numerals in the drawings are intended to refer to the same or similar functions over several aspects. However, it should be noted that the accompanying drawings show only specific exemplary embodiments of the present disclosure, and are not considered to limit the scope of the present disclosure, and other exemplary embodiments having the same effect may be sufficiently recognized.

DETAILED DESCRIPTION

Figure 1:
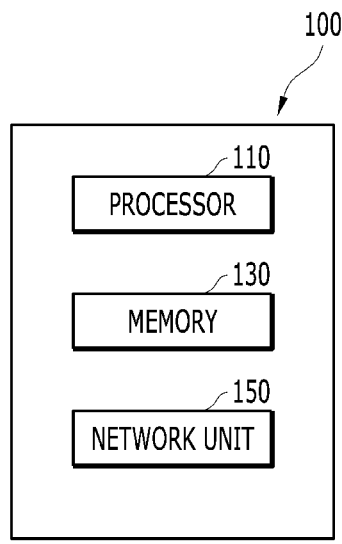
FIG. 1 is a block diagram illustrating a computing device for performing an operation for providing a method of detecting an anomaly of an unmanned moving object according to an exemplary embodiment of the present disclosure.

Various exemplary embodiments are described with reference to the drawings. In the present specification, various descriptions are presented for understanding the present disclosure. However, it is obvious that the exemplary embodiments may be carried out even without a particular description.

Terms, "component", "module", "system", and the like used in the present specification indicate a computer-related entity, hardware, firmware, software, a combination of software and hardware, or execution of software. For example, a component may be a procedure executed in a processor, a processor, an object, an execution thread, a program, and/or a computer, but is not limited thereto. For example, both an application executed in a server and the server may be components. One or more components may reside within a processor and/or an execution thread. One component may be localized within one computer. One component may be distributed between two or more computers. Further, the components may be executed by various computer readable media having various data structures stored therein. For example, components may communicate through local and/or remote processing according to a signal (for example, data transmitted to another system through a network, such as the Internet, through data and/or a signal from one component interacting with another component in a local system and a distributed system) having one or more data packets.

A term "or" intends to mean comprehensive "or" not exclusive "or". That is, unless otherwise specified or when it is unclear in context, "X uses A or B" intends to mean one of the natural comprehensive substitutions. That is, when X uses A, X uses B, or X uses both A and B, or "X uses A or B" may be applied to any one among the cases. Further, a term "and/or" used in the present specification shall be understood to designate and include all of the possible combinations of one or more items among the listed relevant items.

It should be understood that a term "include" and/or "including" means that a corresponding characteristic and/or a constituent element exists. Further, a term "include" and/or "including" means that a corresponding characteristic and/or a constituent element exists, but it shall be understood that the existence or an addition of one or more other characteristics, constituent elements, and/or a group thereof is not excluded. Further, unless otherwise specified or when it is unclear in context that a single form is indicated, the singular shall be construed to generally mean "one or more" in the present specification and the claims.

The term "at least one of A and B" should be interpreted to mean "the case including only A", "the case including only B", and "the case where A and B are combined".

Those skilled in the art shall recognize that the various illustrative logical blocks, configurations, modules, circuits, means, logic, and algorithm operations described in relation to the exemplary embodiments additionally disclosed herein may be implemented by electronic hardware, computer software, or in a combination of electronic hardware and computer software. In order to clearly exemplify interchangeability of hardware and software, the various illustrative components, blocks, configurations, means, logic, modules, circuits, and operations have been generally described above in the functional aspects thereof. Whether the functionality is implemented as hardware or software depends on a specific application or design restraints given to the general system. Those skilled in the art may implement the functionality described by various methods for each of the specific applications. However, it shall not be construed that the determinations of the implementation deviate from the range of the contents of the present disclosure.

The description about the presented exemplary embodiments is provided so as for those skilled in the art to use or carry out the present disclosure. Various modifications of the exemplary embodiments will be apparent to those skilled in the art. General principles defined herein may be applied to other exemplary embodiments without departing from the scope of the present disclosure. Therefore, the present disclosure is not limited to the exemplary embodiments presented herein. The present disclosure shall be interpreted within the broadest meaning range consistent to the principles and new characteristics presented herein.

The contents for detecting an anomaly of an unmanned moving object by using a message ID sequence that is the present disclosure will be described. An unmanned aircraft belonging to an unmanned moving object will be described as an example, and the unmanned moving object is not limited only to the unmanned aircraft, but any device belonging to the unmanned moving object is applicable.

FIG. 1 is a block diagram illustrating a computing device for performing an operation for providing a method of detecting an anomaly of an unmanned moving object according to an exemplary embodiment of the present disclosure.

The configuration of a computing device 100 illustrated in FIG. 1 is merely a simplified example. In the exemplary embodiment of the present disclosure, the computing device 100 may include other configurations for performing a computing environment of the computing device 100, and only some of the disclosed configurations may also configure the computing device 100.

The computing device 100 may include a processor 110, a memory 130, and a network unit 150.

In the present disclosure, the processor 110 may detect anomaly of an unmanned moving object by using a message ID sequence.

According to the exemplary embodiment of the present disclosure, the processor 110 may collect packet data generated in an unmanned moving object, pre-processes the collected packet data, and input the pre-processed packet data to a pre-trained neural network model to detect anomaly of the unmanned moving object based on a message ID pattern of the packet data.

According to the exemplary embodiment of the present disclosure, the processor 110 may collect the packet data generated in the unmanned moving object through communication between the unmanned moving object and a Ground Control System (GCS) when collecting the packet data. For example, the unmanned moving object and the GCS may perform communication by using a Micro Air Vehicle Link (MAVLink) protocol. The foregoing matter is merely an example, and the present disclosure is not limited thereto.

According to the exemplary embodiment of the present disclosure, the processor 110 may extract a message ID from the collected packet data, assign an integer value to the extracted message ID, and normalize the integer value assigned to the message ID when pre-processing the collected packet data.

According to the exemplary embodiment of the present disclosure, the processor 110 may extract only the message ID from the collected packet data when extracting the message ID. Herein, the extracted message ID may include an identifier for determining the type of message transceive in the protocol used for the communication of the unmanned moving object. The foregoing matter is merely an example, and the present disclosure is not limited thereto.

According to the exemplary embodiment of the present disclosure, the processor 110 may assign the same integer value to the same message ID, and assign different integer values to different message IDs, respectively, when assigning the integer value to the extracted message ID. The processor 110 may assign a different integer value according to the type of message ID when assigning the integer value to the extracted message ID. For example, when the processor 110 assigns the integer value to the extracted message ID, and when the number of types of message ID is a total of N, any one integer among 1 to N may be assigned to each message ID.

According to the exemplary embodiment of the present disclosure, when normalizing the integer value assigned to the message ID, the processor 110 may normalize the integer value assigned to the message ID to a range of 0 to 1 for scaling a size of the message ID. For example, when the number of types of the message ID is a total of n, the processor 110 may normalize the integer value assigned to each message ID to a result value obtained by dividing the integer value assigned to each message ID by n.

According to the exemplary embodiment of the present disclosure, when the processor 110 detects anomaly of the unmanned moving object, the processor 110 may input the pre-processed packet data to the pre-trained neural network model, predict a message ID following a current message ID sequence of the packet data input to the neural network model, calculate a message ID pattern prediction success rate by comparing the predicted message ID and the actual message ID, and detect anomaly of the unmanned moving object based on the calculated message ID pattern prediction success rate.

According to the exemplary embodiment of the present disclosure, when the processor 110 calculates the message ID pattern success rate, the processor 110 calculates an average value for message ID pattern prediction success rates for a predetermined period of time when the message ID pattern prediction success rate is calculated, and detect anomaly of the unmanned moving object by comparing the calculated average value for the message ID pattern prediction success rates with a predetermined threshold. Herein, when the processor 110 detects anomaly of the unmanned moving object, when the calculated average value for the message ID pattern prediction success rates is smaller than the predetermined threshold, the processor 110 may determine that anomaly of the unmanned moving object is detected. For example, the threshold may be varied according to a structure of the neural network model or an application environment of the neural network model and determined through an experiment. The foregoing matter is merely an example, and the present disclosure is not limited thereto.

According to the exemplary embodiment of the present disclosure, when the processor 110 detects anomaly of the unmanned moving object, the processor 110 may input the pre-processed packet data to the pre-trained neural network model, predict a message ID following a current message ID sequence of the packet data input to the neural network model, calculate a message ID pattern loss value by comparing the predicted message ID and the actual message ID, and detect anomaly of the unmanned moving object based on the calculated message ID pattern loss value.

According to the exemplary embodiment of the present disclosure, when the processor 110 calculates the message ID pattern prediction loss value, the processor 110 calculates an average value for message ID pattern loss values for a predetermined period of time when the message ID pattern loss value is calculated, and detect anomaly of the unmanned moving object by comparing the calculated average value for the message ID pattern loss values with a predetermined threshold. Herein, when the processor 110 detects anomaly of the unmanned moving object, when the calculated average value for the message ID pattern loss values is larger than the predetermined threshold, the processor 110 may determine that anomaly of the unmanned moving object is detected. For example, the threshold may be varied according to a structure of the neural network model or an application environment of the neural network model and determined through an experiment. Further, the average value for the message ID pattern loss values for the predetermined period of time may be calculated by an equation, Average of loss value for N frames=$(Loss_T + Loss_{T-1} + \ldots Loss_{T-N+1})/N$. The foregoing matter is merely an example, and the present disclosure is not limited thereto.

According to the exemplary embodiment of the present disclosure, the processor 110 may pre-train the neural network. Herein, the pre-training of the neural network model may be implemented by collecting normal packet data generated in a normal communication state of the unmanned moving object, pre-processing the collected normal packet data, inputting the pre-processed normal packet data to the neural network model, and predicting a message ID following a current message ID sequence of the normal packet data. For example, the neural network model may have a hierarchical structure including a one-dimensional convolution layer, Gated Recurrent Units (GRUs), and a dense layer. The foregoing matter is merely an example, and the present disclosure is not limited thereto.

As described above, the processor 110 may consist of one or more cores, and may include a processor, such as a Central Processing Unit (CPU), a General Purpose Graphics Processing Unit (GPGPU), and a Tensor Processing Unit (TPU) of the computing device 100, for deep learning. The processor 110 may read a computer program stored in the memory 130 and detect anomaly of an unmanned moving object according to the exemplary embodiment of the present disclosure. According to the exemplary embodiment of the present disclosure, the processor 110 may perform computation for detecting an anomaly of the unmanned moving object. The processor 110 may perform a calculation, such as processing of input data for training in Deep Learning (DN), extraction of a feature from input data, an error calculation, and updating of a weight of the neural network by using backpropagation, for training the neural network. At least one of the CPU, GPGPU, and TPU of the processor 110 may process training of the network function. For example, both the CPU and the GPGPU may process learning of the network function and detection of anomaly of an unmanned moving object by using the network function. Further, according to the exemplary embodiment of the present disclosure, the learning of the network function and the detecting of anomaly of the unmanned moving object by using the network function may be processed by using the processors of the plurality of computing devices together. Further, the computer program executed in the computing device according to the exemplary embodiment of the present disclosure may be a CPU, GPGPU, or TPU executable program.

According to the exemplary embodiment of the present disclosure, the memory 130 may store a predetermined form of information generated or determined by the processor 110 and a predetermined form of information received by the network unit 150.

According to the exemplary embodiment of the present disclosure, the memory 130 may include at least one type of storage medium among a flash memory type, a hard disk type, a multimedia card micro type, a card type of memory (for example, an SD or XD memory), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, and an optical disk. The computing device 100 may also be operated in relation to web storage performing a storage function of the memory 130 on the Internet. The description of the foregoing memory is merely illustrative, and the present disclosure is not limited thereto.

According to the exemplary embodiment of the present disclosure, the network unit 150 may transceive data and the like for performing the detection of the anomaly of the unmanned moving object with other computing devices, servers, and the like. The network unit 150 may transceive data for performing the detection of the anomaly of the unmanned moving object with other computing devices, servers, and the like. Further, the network unit 150 may enable the plurality of computing devices to communicate with each other, so that the training of the network function is distributed and performed in each of the plurality of computing devices. The network unit 150 may enable the plurality of computing devices to communicate with each other, so that analyzed data generation by using the network function is distributed and performed.

According to the exemplary embodiment of the present disclosure, the network unit 150 may be configured regardless of its communication mode, such as a wired mode and a wireless mode, and may be configured of various communication networks, such as a Personal Area Network (PAN) and a Wide Area Network (WAN). Further, the network unit 150 may be the publicly known World Wide Web (WWW), and may also use a wireless transmission technology used in PAN, such as Infrared Data Association (IrDA) or Bluetooth. The technologies described in the present specification may be used in other networks, as well as the foregoing networks.

As described above, the present disclosure may detect anomaly of an unmanned moving object by using a message ID sequence.

In the case of the anomaly detection model using a sequence of various sensor values, a log of overhead occurs because various sensor values need to be processed, used, and combined, but the present disclosure is the method of detecting an anomaly of the unmanned moving object by using the message ID sequence, and uses only the message ID sequence for detecting an anomaly, which is advantageous for data processing utilization.

Figure 2:
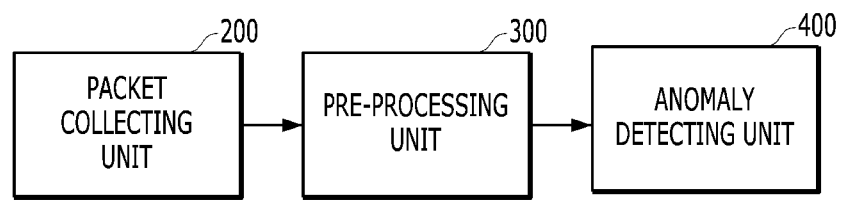
FIG. 2 is a block diagram illustrating a processor for describing the method of detecting an anomaly of an unmanned moving object according to the exemplary embodiment of the present disclosure.

FIG. 2 is a block diagram illustrating a processor for describing the method of detecting an anomaly of an unmanned moving object according to the exemplary embodiment of the present disclosure.

As illustrated in FIG. 2, the processor of the present disclosure may include a packet collecting unit 200, a pre-processing unit 300, and an anomaly detecting unit 400.

The packet collecting unit 200 may collect a packet generated in the unmanned moving object. For example, in order to collect the packet generated in the unmanned aircraft, a Ground Control System (GCS) may be used, and in this case, the GCS may be the packet collecting unit 200.

The pre-processing unit 300 may extract a message ID from the collected packet so as to be used by the deep learning model. Herein, the message ID may be an identifier used for determining the type of message transceived in the protocol used by the unmanned moving object for the communication. For example, the communication protocol widely used in the unmanned aircraft may include the MAVLink protocol, and the like. The message ID may be included in a protocol format as illustrated in FIG. 3.

Figure 3:
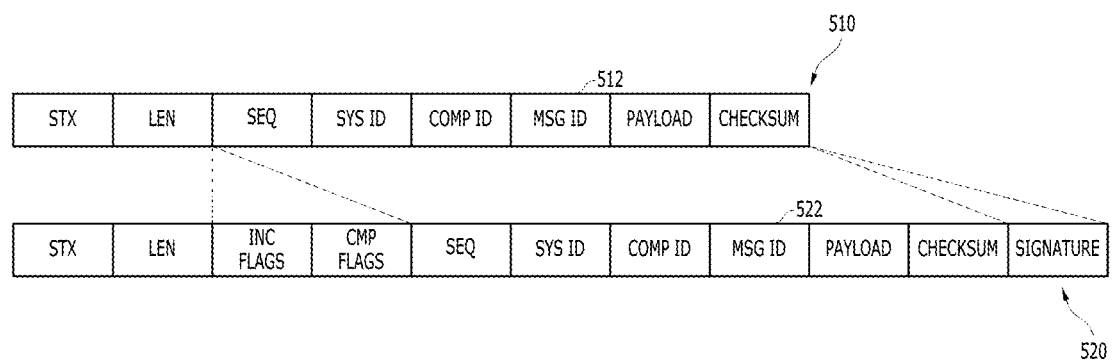
FIG. 3 is a diagram illustrating packet data including a message ID according to the exemplary embodiment of the present disclosure.

FIG. 3 is a diagram illustrating packet data including a message ID according to the exemplary embodiment of the present disclosure, and as illustrated in FIG. 3, the communication protocol used for the unmanned aircraft may be the MAVLink protocol, and packet data 510 transceived in the MAVLink 1 protocol that is version 1 may include a message ID 512, and packet data 520 transceived in the MAVLink 2 protocol that is version 2 may include a message ID 522. Herein, the message ID may be an identifier used for determining the type of message transceived in the protocol used by the unmanned moving object for the communication.

Next, the pre-processing unit 300 may pre-process the extracted message ID. In this case, the pre-processing may vary depending on the used deep learning model. The data output from the pre-processing unit 300 may be the pre-processed message ID sequence.

Figure 4:
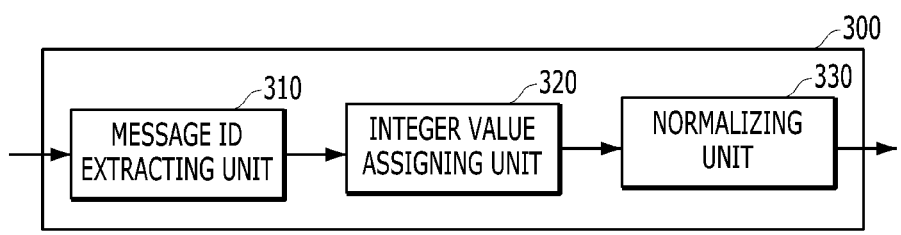
FIG. 4 is a block diagram illustrating a pre-processing unit according to the exemplary embodiment of the present disclosure.

FIG. 4 is a block diagram illustrating a pre-processing unit according to the exemplary embodiment of the present disclosure.

As illustrated in FIG. 4, the pre-processing unit 300 may include a message ID extracting unit 310, an integer value assigning unit 320, and a normalizing unit 330.

The message ID extracting unit 310 may extract a message ID from the protocol packet used in the unmanned moving object.

The integer value assigning unit 320 may assign a new integer value to the extracted message ID. For example, in the MAVLink 2 protocol, the case where the message ID is 0x00008D may represent that the message ID is a packet containing altitude information about the unmanned aircraft, and the case where the message ID is 0x000000 may represent that the message ID is a heartbeat packet for checking whether the unmanned aircraft or the GCS are normally communicated. All of the message IDs of 0x00008D may be converted to 1 by assigning an integer 1, and all of the message IDs of 0x000000 may be converted to 2 by assigning an integer 2. The reason for converting the message ID into different integers is to make the deep learning model easily use the message ID through normalization.

In the exemplary embodiment, the integer value assigning unit 320 may assign the same integer value to the same message ID, and may assign different integer values to different message IDs, respectively. Further, the integer value assigning unit 320 may also assign different integer values depending on the type of message ID. For example, when the integer value is assigned to the extracted message ID and when the number of types of the message ID is a total of N, the processor 110 may assign any one integer of 1 to N to each message ID.

The normalization unit 330 may scale the size of the message ID converted to the new integer. For example, when the integers assigned by the integer value assigning unit 320 are 1 to 24, that is, the number of types of the message ID is 24, each integer value may be divided by 24.

The message ID converted to integer 1 may finally have a value of 1/24, and the message ID converted to integer 24 may finally have a value of 1.

In the exemplary embodiment, the normalizing unit 330 may normalize the integer value assigned to the message ID to the range of 0 to 1 for scaling the size of the message ID. For example, when the number of types of the message ID is a total of n, the normalizing unit 330 may normalize the integer value to a result value obtained by dividing the integer value assigned to each message ID by n.

Next, the anomaly detecting unit 400 may be a deep learning model for receiving an actual message ID sequence output by the pre-processing unit 300 and detecting anomalies. The anomaly detecting unit 400 may learn a message ID pattern transceived in a normal state. That is, the anomaly detecting unit 400 may be trained to predict a message ID that will appear immediately after the corresponding sequence when the message ID sequence having a predetermined length is input. When an attack on the unmanned moving object occurs, the transceived message ID pattern may be different from the normal pattern, and in this case, the pre-trained anomaly detecting unit 400 may have a significantly lower prediction rate than in the case of the general normal state. The index for determining whether there is an anomaly may be an average of prediction success rates or an average of loss values for a predetermined period of time.

For example, the average of the loss values may be calculated as Equation 1 below. Herein, the frame means a time unit receiving one message.

$$\text{(Average of loss values for } N \text{ frames)} = \frac{Loss_T + Loss_{T-1} + \ldots Loss_{T-N+1}}{N} \quad \text{[Equation 1]}$$

Accordingly, when the average of the prediction success rates is smaller than a threshold or the average of the loss values is larger than a threshold, the pre-trained anomaly detecting unit 400 may determine that the anomaly is detected. In this case, the threshold may greatly vary according to the structure of the anomaly detection model, an environment to which the detection model is applied, and the like, so that the threshold needs to be determined through an experiment.

In the exemplary embodiment, the anomaly detecting unit 400 may input the pre-processed packet data to the pre-trained neural network model, predict a message ID following a current message ID sequence of the packet data input to the neural network model, calculate a message ID pattern prediction success rate by comparing the predicted message ID and an actual message ID, and detect an anomaly of the unmanned moving object based on the calculated message ID pattern prediction success rate.

When the anomaly detecting unit 400 calculates the message ID pattern prediction success rate, the anomaly detecting unit 400 calculates an average value for message ID pattern prediction success rates for a predetermined period of time, and detect an anomaly of the unmanned moving object by comparing the calculated average value for the message ID pattern prediction success rates with a predetermined threshold. Herein, when the calculated average value for the message ID pattern prediction success rates is smaller than the predetermined threshold, the anomaly detecting unit 400 may determine that the anomaly of the unmanned moving object is detected. For example, the threshold value may be varied according to a structure of the neural network model or an application environment of the neural network model and determined through an experiment. The foregoing matter is merely an example, and the present disclosure is not limited thereto.

In another exemplary embodiment, the anomaly detecting unit 400 may input the pre-processed packet data to the pre-trained neural network model, predict a message ID following a current message ID sequence of the packet data input to the neural network model, calculate a message ID pattern loss value by comparing the predicted message ID and an actual message ID, and detect an anomaly of the unmanned moving object based on the calculated message ID pattern loss value.

The anomaly detecting unit 400 may calculate an average value for the message ID pattern loss values for a predetermined period of time when the message ID pattern loss value is calculated, and detect an anomaly of the unmanned moving object by comparing the calculated average value for the message ID pattern loss values with a predetermined threshold. Herein, when the calculated average value for the message ID pattern loss values is larger than the predetermined threshold, the anomaly detecting unit 400 may determine that anomaly of the unmanned moving object is detected. For example, the threshold value may be varied according to a structure of the neural network model or an application environment of the neural network model and determined through an experiment. Further, the average value for the message ID pattern loss values for the predetermined period of time may be calculated by an equation, Average of loss value for N frames=$(Loss_T+Loss_{T-1}+ \ldots Loss_{T-N+1})/N$. The foregoing matter is merely an example, and the present disclosure is not limited thereto.

Figure 5:
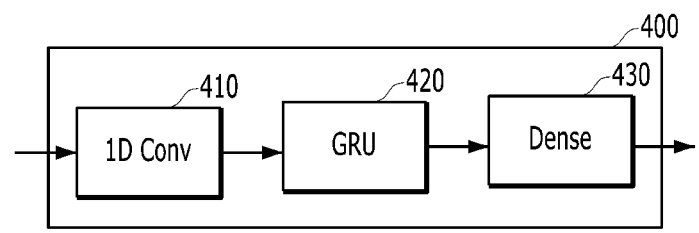
FIG. 5 is a block diagram for describing a neural network model according to the exemplary embodiment of the present disclosure.

FIG. 5 is a block diagram for describing a neural network model according to the exemplary embodiment of the present disclosure.

As illustrated in FIG. 5, the neural network model of the anomaly detecting unit 400 may predict a message ID appearing immediately after the corresponding sequence by receiving the message ID sequence output by the pre-processing unit 300. Herein, the neural network model of the anomaly detecting unit 400 may have a hierarchical structure including a one-dimensional convolution layer 410, a Gated Recurrent Unit layer 420, and a dense layer 430. The foregoing matter is merely an example, and the present disclosure is not limited thereto. The hierarchical structure of the neural network model may be changed within the range in which its function is maintained as long as the neural network model has the function of receiving a message ID sequence and predicting a message ID.

The pre-training of the neural network model may be implemented by collecting normal packet data generated in a normal communication state of the unmanned moving object, pre-processing the collected normal packet data, inputting the pre-processed normal packet data to the neural network model, and predicting a message ID following a current message ID sequence of the normal packet data.

Throughout the present specification, a calculation model, a nerve network, the network function, and the neural network may be used with the same meaning. The neural network may be formed of a set of interconnected calculation units which are generally referred to as "nodes". The "nodes" may also be called "neurons". The neural network consists of one or more nodes. The nodes (or neurons) configuring the neural network may be interconnected by one or more links.

In the neural network, one or more nodes connected through the links may relatively form a relationship of an input node and an output node. The concept of the input node is relative to the concept of the output node, and a predetermined node having an output node relationship with respect to one node may have an input node relationship in a relationship with another node, and a reverse relationship is also available. As described above, the relationship between the input node and the output node may be generated based on the link. One or more output nodes may be connected to one input node through a link, and a reverse case may also be valid.

In the relationship between an input node and an output node connected through one link, a value of the output node may be determined based on data input to the input node. Herein, a node connecting the input node and the output node may have a parameter. The parameter is variable, and in order for the neural network to perform the desired function, the parameter may be varied by a user or an algorithm. For example, when one or more input nodes are connected to one output node by links, respectively, a value of the output node may be determined based on values input to the input nodes connected to the output node and the parameter set in the link corresponding to each of the input nodes.

As described above, in the neural network, one or more nodes are connected with each other through one or more links to form a relationship of an input node and an output node in the neural network. A characteristic of the neural network may be determined according to the number of nodes and links in the neural network, a correlation between the nodes and the links, and a value of the parameter assigned to each of the links. For example, when there are two neural networks in which the numbers of nodes and links are the same and the parameter values between the links are different, the two neural networks may be recognized to be different from each other.

The neural network may consist of one or more nodes. Some of the nodes configuring the neural network may form one layer based on distances from an initial input node. For example, a set of nodes having a distance of n from an initial input node may form n layers. The distance from the initial input node may be defined by the minimum number of links, which need to be passed from the initial input node to a corresponding node. However, the definition of the layer is arbitrary for the description, and the degree of the layer in the neural network may be defined by a different method from the foregoing method. For example, the layers of the nodes may be defined by a distance from a final output node.

The initial input node may mean one or more nodes to which data is directly input without passing through a link in a relationship with other nodes among the nodes in the neural network. Otherwise, the initial input node may mean nodes which do not have other input nodes connected through the links in a relationship between the nodes based on the link in the neural network. Similarly, the final output node may mean one or more nodes that do not have an output node in a relationship with other nodes among the nodes in the neural network. Further, the hidden node may mean nodes configuring the neural network, not the initial input node and the final output node. In the neural network according to the exemplary embodiment of the present disclosure, the number of nodes of the input layer may be the same as the number of nodes of the output layer, and the neural network may be in the form that the number of nodes decreases and then increases again from the input layer to the hidden layer. Further, in the neural network according to another exemplary embodiment of the present disclosure, the number of nodes of the input layer may be smaller than the number of nodes of the output layer, and the neural network may be in the form that the number of nodes decreases from the input layer to the hidden layer. Further, in the neural network according to another exemplary embodiment of the present disclosure, the number of nodes of the input layer may be larger than the number of nodes of the output layer, and the neural network may be in the form that the number of nodes increases from the input layer to the hidden layer. The neural network according to another exemplary embodiment of the present disclosure may be the neural network in the form in which the foregoing neural networks are combined.

A deep neural network (DNN) may mean the neural network including a plurality of hidden layers, in addition to an input layer and an output layer. When the DNN is used, it is possible to recognize a latent structure of data. That is, it is possible to recognize latent structures of photos, texts, videos, voice, and music (for example, what objects are in the photos, what the content and emotions of the texts are, and what the content and emotions of the voice are). The DNN may include a convolutional neural network (CNN), a recurrent neural network (RNN), an autoencoder, Generative Adversarial Networks (GAN), a restricted Boltzmann machine (RBM), a deep belief network (DBN), a Q network, a U network Siamese network, and the like. The foregoing description of the deep neural network is merely illustrative, and the present disclosure is not limited thereto.

Figure 6:
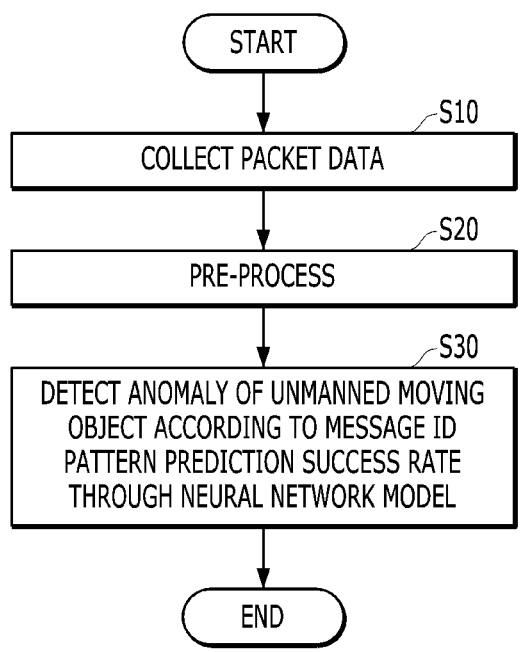
FIG. 6 is a flowchart for describing a method of detecting an anomaly of an unmanned moving object according to an exemplary embodiment of the present disclosure.

FIG. 6 is a flowchart for describing a method of detecting an anomaly of an unmanned moving object according to an exemplary embodiment of the present disclosure.

As illustrated in FIG. 6, the computing device of the present disclosure may collect packet data generated in an unmanned moving object (S10). Herein, the computing device may collect the packet data generated in the unmanned moving object through communication between the unmanned moving object and the GCS. For example, the unmanned moving object and the GCS may perform communication by using a Micro Air Vehicle Link (MAVLink) protocol.

The computing device of the present disclosure may pre-process the collected packet data (S20). Herein, the computing device may extract a message ID from the collected packet data, assign an integer value to the extracted message ID, and normalize the integer value assigned to the message ID.

The computing device may extract only the message ID from the collected packet data when extracting the message ID. For example, the extracted message ID may include an identifier for determining the type of message transceived in the protocol used for the communication of the unmanned moving object. Further, the computing device may assign the same integer value to the same message ID, and assign different integer values to different message IDs, respectively, when assigning the integer value to the extracted message ID. Herein, the computing device may assign a different integer value according to the type of message ID when assigning the integer value to the extracted message ID. For example, when the computing device assigns the integer value to the extracted message ID, and when the number of types of message ID is a total of N, any one integer among 1 to N may be assigned to each message ID. Further, when normalizing the integer value assigned to the message ID, the computing device may normalize the integer value assigned to the message ID to a range of 0 to 1 for scaling the size of the message ID. For example, when the number of types of the message ID is a total of n, the computing device may normalize the integer value assigned to each message ID to a result value obtained by dividing the integer value assigned to each message ID by n.

Subsequently, the computing device of the present disclosure may input the pre-processed packet data to a pre-trained neural network model to detect an anomaly of the unmanned moving object based on a message ID pattern of the packet data (S30).

In the exemplary embodiment, the computing device may input the pre-processed packet data to the pre-trained neural network model, predict a message ID following a current message ID sequence of the packet data input to the neural network model, calculate a message ID pattern prediction success rate by comparing the predicted message ID and an actual message ID, and detect an anomaly of the unmanned moving object based on the calculated message ID pattern prediction success rate. When the computing device calculates the message ID pattern prediction success rate, the computing device calculates an average value for message ID pattern prediction success rates for a predetermined period of time when the message ID pattern prediction success rate is calculated, and detect an anomaly of the unmanned moving object by comparing the calculated average value for the message ID pattern prediction success rates with a predetermined threshold. Herein, when the computing device detects anomalies of the unmanned moving object, when the calculated average value for the message ID pattern prediction success rates is smaller than the predetermined threshold, the computing device may determine that the anomaly of the unmanned moving object is detected. For example, the threshold value may be varied according to a structure of the neural network model or an application environment of the neural network model and determined through an experiment. The foregoing matter is merely an example, and the present disclosure is not limited thereto.

In another exemplary embodiment, the computing device may input the pre-processed packet data to the pre-trained neural network model, predict a message ID following a current message ID sequence of the packet data input to the neural network model, calculate a message ID pattern loss value by comparing the predicted message ID and an actual message ID, and detect an anomaly of the unmanned moving object based on the calculated message ID pattern loss value. When the computing device calculates the message ID pattern loss value, the computing device may calculate an average value for message ID pattern loss values for a predetermined period of time when the message ID pattern loss value is calculated, and detect an anomaly of the unmanned moving object by comparing the calculated average value for the message ID pattern loss values with a predetermined threshold. Herein, when the computing device detects anomalies of the unmanned moving object, when the calculated average value for the message ID pattern loss values is larger than the predetermined threshold, the computing device may determine that anomaly of the unmanned moving object is detected. For example, the threshold value may be varied according to a structure of the neural network model or an application environment of the neural network model and determined through an experiment. Further, the average value for the message ID pattern loss values for the predetermined period of time may be calculated by an equation, Average of loss value for N frames=$(Loss_T, +Loss_{T-1}+ \ldots Loss_{T-N+1})/N$.

The computing device of the present disclosure may pre-train the neural network model. Herein, the pre-training of the neural network model may be implemented by collecting normal packet data generated in a normal communication state of the unmanned moving object, pre-processing the collected normal packet data, inputting the pre-processed normal packet data to the neural network model, and predicting a message ID following a current message ID sequence of the normal packet data.

As described above, the present disclosure may detect anomalies of an unmanned moving object by using a message ID sequence.

In the case of the anomaly detection model using a sequence of various sensor values, a log of overhead occurs because various sensor values need to be processed, used, and combined, but the present disclosure is the method of detecting anomaly of the unmanned moving object by using the message ID sequence, and uses only the message ID sequence for detecting anomalies, which is advantageous for data processing utilization.

Figure 7:
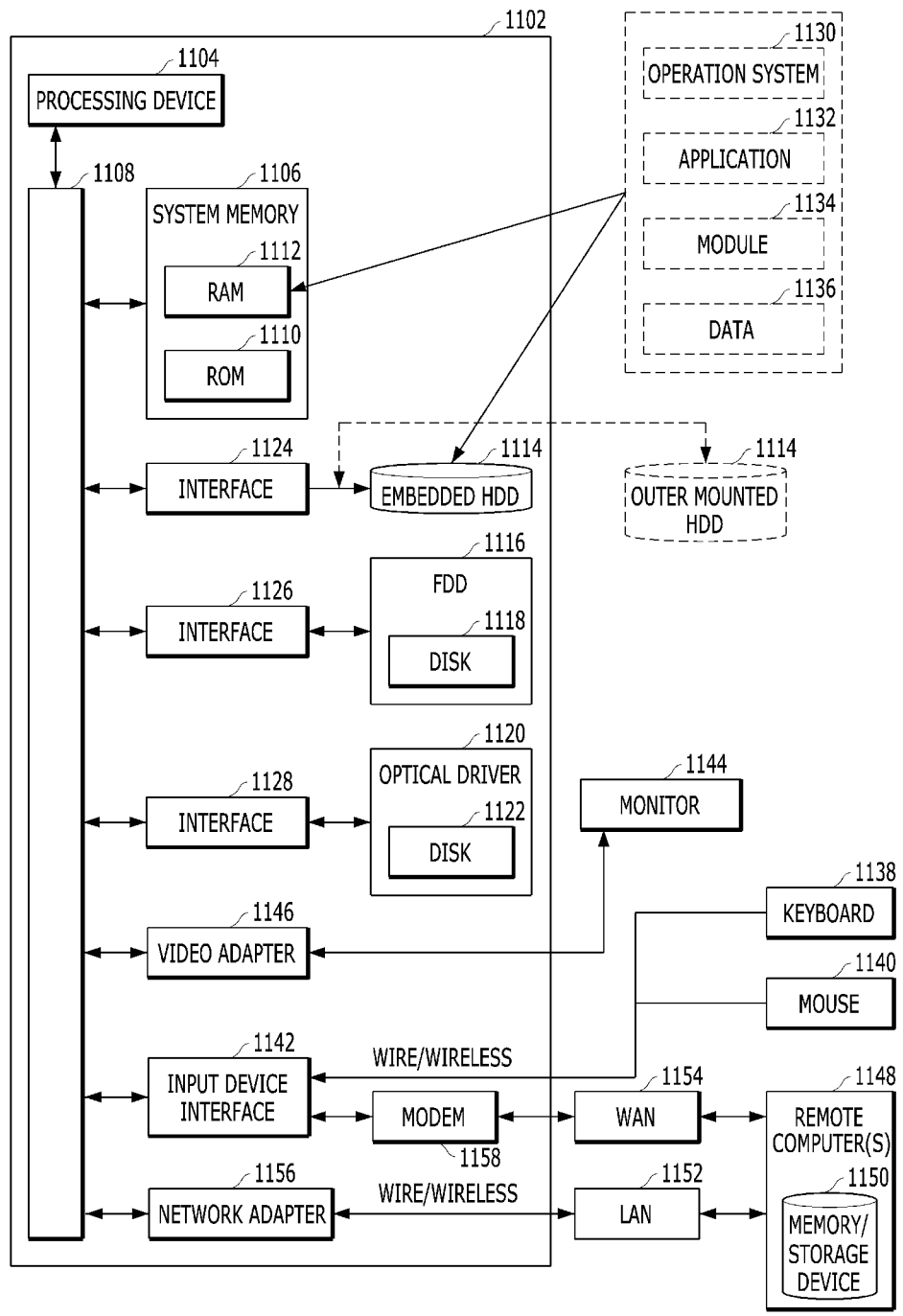
FIG. 7 is a general schematic diagram illustrating an example of a computing environment in which the exemplary embodiments of the present disclosure are implementable.

FIG. 7 is a general schematic diagram illustrating an example of a computing environment in which the exemplary embodiments of the present disclosure are implementable.

Although the present disclosure has been described generally in connection with the computer executable instructions that may be executed on one or more computers, those skilled in the art will appreciate that the present disclosure may be implemented through a combination of other program modules of the present disclosure and/or a combination of hardware and software.

In general, a module in the present specification includes a routine, a procedure, a program, a component, a data structure, and the like performing a specific task or implementing a specific abstract data type. Further, those skilled in the art will appreciate well that the method of the present disclosure may be carried out by a personal computer, a hand-held computing device, a microprocessor-based or programmable home appliance (each of which may be connected with one or more relevant devices and be operated), and other computer system configurations, as well as a single-processor or multiprocessor computer system, a mini computer, and a main frame computer.

The exemplary embodiments of the present disclosure may be carried out in a distribution computing environment, in which certain tasks are performed by remote processing devices connected through a communication network. In the distribution computing environment, a program module may be positioned in both a local memory storage device and a remote memory storage device.

The computer generally includes various computer readable media. The computer readable medium includes volatile and non-volatile media, transitory and non-non-transitory media, and portable and non-portable media. As a non-limited example, the computer readable medium may include a computer readable storage medium and a computer readable transmission medium.

The computer readable storage medium includes volatile and non-volatile media, transitory and non-transitory media, and portable and non-portable media constructed by a predetermined method or technology, which stores information, such as a computer readable command, a data structure, a program module, or other data. The computer readable storage medium includes a Random Access Memory (RAM), a Read Only Memory (ROM), an Electrically Erasable and Programmable ROM (EEPROM), a flash memory, or other memory technologies, a Compact Disc (CD)-ROM, a Digital Video Disk (DVD), or other optical disk storage devices, a magnetic cassette, a magnetic tape, a magnetic disk storage device, or other magnetic storage device, or other predetermined media, which are accessible by a computer and are used for storing desired information, but is not limited thereto.

The computer readable transport medium generally includes all of the information transport media, such as a carrier wave or other transport mechanisms, which implement a computer readable command, a data structure, a program module, or other data in a modulated data signal. The modulated data signal means a signal, of which one or more of the characteristics are set or changed so as to encode information within the signal. As a non-limited example, the computer readable transport medium includes a wired medium, such as a wired network or a direct-wired connection, and a wireless medium, such as sound, Radio Frequency (RF), infrared rays, and other wireless media. A combination of the predetermined media among the foregoing media is also included in a range of the computer readable transport medium.

An illustrative environment 1100 including a computer 1102 and implementing several aspects of the present disclosure is illustrated, and the computer 1102 includes a processing device 1104, a system memory 1106, and a system bus 1108. The system bus 1108 connects system components including the system memory 1106 (not limited) to the processing device 1104. The processing device 1104 may be a predetermined processor among various commonly used processors. A dual processor and other multi-processor architectures may also be used as the processing device 1104.

The system bus 1108 may be a predetermined one among several types of bus structure, which may be additionally connectable to a local bus using a predetermined one among a memory bus, a peripheral device bus, and various common bus architectures. The system memory 1106 includes a ROM 1110, and a RAM 1112. A basic input/output system (BIOS) is stored in a non-volatile memory 1110, such as a ROM, an erasable and programmable ROM (EPROM), and an EEPROM, and the BIOS includes a basic routing helping a transport of information among the constituent elements within the computer 1102 at a time, such as starting. The RAM 1112 may also include a high-rate RAM, such as a static RAM, for caching data.

The computer 1102 also includes an embedded hard disk drive (HDD) 1114 (for example, enhanced integrated drive electronics (EIDE) and serial advanced technology attachment (SATA))—the embedded HDD 1114 being configured for outer mounted usage within a proper chassis (not illustrated)—a magnetic floppy disk drive (FDD) 1116 (for example, which is for reading data from a portable diskette 1118 or recording data in the portable diskette 1118), and an optical disk drive 1120 (for example, which is for reading a CD-ROM disk 1122, or reading data from other high-capacity optical media, such as a DVD, or recording data in the high-capacity optical media). A hard disk drive 1114, a magnetic disk drive 1116, and an optical disk drive 1120 may be connected to a system bus 1108 by a hard disk drive interface 1124, a magnetic disk drive interface 1126, and an optical drive interface 1128, respectively. An interface 1124 for implementing an outer mounted drive includes, for example, at least one of or both a universal serial bus (USB) and the Institute of Electrical and Electronics Engineers (IEEE) 1394 interface technology.

The drives and the computer readable media associated with the drives provide non-volatile storage of data, data structures, computer executable commands, and the like. In the case of the computer 1102, the drive and the medium correspond to the storage of random data in an appropriate digital form. In the description of the computer readable storage media, the HDD, the portable magnetic disk, and the portable optical media, such as a CD, or a DVD, are mentioned, but those skilled in the art will well appreciate that other types of computer readable storage media, such as a zip drive, a magnetic cassette, a flash memory card, and a cartridge, may also be used in the illustrative operation environment, and the predetermined medium may include computer executable commands for performing the methods of the present disclosure.

A plurality of program modules including an operation system 1130, one or more application programs 1132, other program modules 1134, and program data 1136 may be stored in the drive and the RAM 1112. An entirety or a part of the operation system, the application, the module, and/or data may also be cached in the RAM 1112. It will be well appreciated that the present disclosure may be implemented by several commercially usable operation systems or a combination of operation systems.

A user may input a command and information to the computer 1102 through one or more wired/wireless input devices, for example, a keyboard 1138 and a pointing device, such as a mouse 1140. Other input devices (not illustrated) may be a microphone, an IR remote controller, a joystick, a game pad, a stylus pen, a touch screen, and the like. The foregoing and other input devices are frequently connected to the processing device 1104 through an input device interface 1142 connected to the system bus 1108, but may be connected by other interfaces, such as a parallel port, an IEEE 1394 serial port, a game port, a USB port, an IR interface, and other interfaces.

A monitor 1144 or other types of display devices are also connected to the system bus 1108 through an interface, such as a video adaptor 1146. In addition to the monitor 1144, the computer generally includes other peripheral output devices (not illustrated), such as a speaker and a printer.

The computer 1102 may be operated in a networked environment by using a logical connection to one or more remote computers, such as remote computer(s) 1148, through wired and/or wireless communication. The remote computer(s) 1148 may be a work station, a server computer, a router, a personal computer, a portable computer, a microprocessor-based entertainment device, a peer device, and other general network nodes, and generally includes some or an entirety of the constituent elements described for the computer 1102, but only a memory storage device 1150 is illustrated for simplicity. The illustrated logical connection includes a wired/wireless connection to a local area network (LAN) 1152 and/or a larger network, for example, a wide area network (WAN) 1154. The LAN and WAN networking environments are general in an office and a company, and make an enterprise-wide computer network, such as an Intranet, easy, and all of the LAN and WAN networking environments may be connected to a worldwide computer network, for example, the Internet.

When the computer 1102 is used in the LAN networking environment, the computer 1102 is connected to the local network 1152 through a wired and/or wireless communication network interface or an adaptor 1156. The adaptor 1156 may make wired or wireless communication to the LAN 1152 easy, and the LAN 1152 also includes a wireless access point installed therein for the communication with the wireless adaptor 1156. When the computer 1102 is used in the WAN networking environment, the computer 1102 may include a modem 1158, is connected to a communication server on a WAN 1154, or includes other means setting communication through the WAN 1154 via the Internet. The modem 1158, which may be an embedded or outer-mounted and wired or wireless device, is connected to the system bus 1108 through a serial port interface 1142. In the networked environment, the program modules described for the computer 1102 or some of the program modules may be stored in a remote memory/storage device 1150. The illustrated network connection is illustrative, and those skilled in the art will appreciate well that other means setting a communication link between the computers may be used.

The computer 1102 performs an operation of communicating with a predetermined wireless device or entity, for example, a printer, a scanner, a desktop and/or portable computer, a portable data assistant (PDA), a communication satellite, predetermined equipment or place related to a wirelessly detectable tag, and a telephone, which is disposed by wireless communication and is operated. The operation includes a wireless fidelity (Wi-Fi) and Bluetooth wireless technology at least. Accordingly, the communication may have a pre-defined structure, such as a network in the related art, or may be simply ad hoc communication between at least two devices.

The Wi-Fi enables a connection to the Internet and the like even without a wire. The Wi-Fi is a wireless technology, such as a cellular phone, which enables the device, for example, the computer, to transmit and receive data indoors and outdoors, that is, in any place within a communication range of a base station. A Wi-Fi network uses a wireless technology, which is called IEEE 802.11 (a, b, g, etc.) for providing a safe, reliable, and high-rate wireless connection. The Wi-Fi may be used for connecting the computer to the computer, the Internet, and the wired network (IEEE 802.3 or Ethernet is used). The Wi-Fi network may be operated at, for example, a data rate of 11 Mbps (802.11a) or 54 Mbps (802.11b) in an unauthorized 2.4 and 5 GHz wireless band, or may be operated in a product including both bands (dual bands).

Those skilled in the art will appreciate that the various illustrative logical blocks, modules, processors, means, circuits, and algorithm operations described in relation to the exemplary embodiments disclosed herein may be implemented by electronic hardware (for convenience, called "software" herein), various forms of program or design code, or a combination thereof. In order to clearly describe compatibility of the hardware and the software, various illustrative components, blocks, modules, circuits, and operations are generally illustrated above in relation to the functions of the hardware and the software. Whether the function is implemented as hardware or software depends on design limits given to a specific application or an entire system. Those skilled in the art may perform the function described by various schemes for each specific application, but it shall not be construed that the determinations of the performance depart from the scope of the present disclosure.

Various exemplary embodiments presented herein may be implemented by a method, a device, or a manufactured article using a standard programming and/or engineering technology. A term "manufactured article" includes a computer program or a medium accessible from a predetermined computer-readable storage device. For example, the computer-readable storage medium includes a magnetic storage device (for example, a hard disk, a floppy disk, and a magnetic strip), an optical disk (for example, a CD and a DVD), a smart card, and a flash memory device (for example, an EEPROM, a card, a stick, and a key drive), but is not limited thereto. A term "machine-readable medium" includes a wireless channel and various other media, which are capable of storing, holding, and/or transporting a command(s) and/or data, but is not limited thereto.

Figure 8:
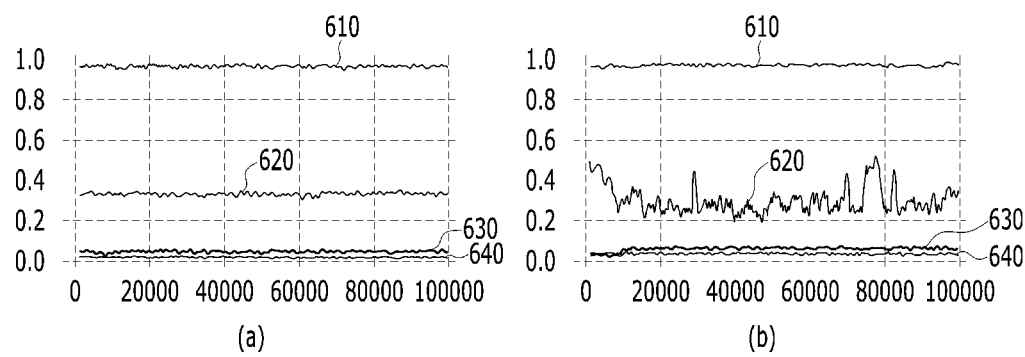
FIG. 8 is a diagram for describing a result of an experiment by using the method of detecting an anomaly of an unmanned moving object according to the exemplary embodiment of the present disclosure.

FIG. 8 is a diagram for describing a result of an experiment by using the method of detecting an anomaly of an unmanned moving object according to the exemplary embodiment of the present disclosure.

According to the exemplary embodiment, the GCS may collect four individual packet captures of Attack-free, Heartbeat flooding, Ping flooding, and Request flooding. Further, the four individual packet captures may be a data set for performing an experiment according to the present disclosure. Further, the experiment may use two unmanned moving object simulators of a Software-In-The-Loop (SITL) simulator and a Hardware-In-The-Loop (HITL) simulator, and thus, the total number of data sets is eight. Depending on the exemplary embodiment, the GCS and the unmanned moving object may use a User Datagram Protocol (UDP) for performing communication by using the MAVLink protocol. Each of the individual packet captures includes a packet generated by the unmanned moving object, and may not include a packet generated by an attacker.

In the present experiment, in order to train a neural network model M1, an attack-free set may be labeled as 0, and another set of each attack may be labeled as 1. Then, the two labels are connected and mixed, and then 80% of the sets may be divided into a training set and 20% of the sets may be divided into a verification set. A result of the performance evaluation using the verification set may be represented in Table 1 below.

TABLE 1

| Simulator | Attack type | Epochs | Precision | Recall | F1-score |
|---|---|---|---|---|---|
| SITL | Heartbeat flooding | 93 | 0.98 | 0.97 | 0.98 |
|  | Ping flooding | 1 | 1.00 | 1.00 | 1.00 |
|  | Request flooding | 1 | 1.00 | 1.00 | 1.00 |
| HITL | Heartbeat flooding | 2 | 1.00 | 1.00 | 1.00 |
|  | Ping flooding | 1 | 1.00 | 1.00 | 1.00 |
|  | Request flooding | 1 | 1.00 | 1.00 | 1.00 |

Herein, the Epochs column may represent the number of times of the training that the neural network model needs to learn to reach the best intrusion detection performance for the verification set when the neural network model learns the training set. Further, it can be seen that the ping flooding and the request flooding are completely identified according to the use of the method of detecting anomalies of the unmanned moving object according to the present disclosure. The heartbeat flooding does not trigger a message out of the context when a message is sent from a target unmanned moving object to the GCS, so that the heartbeat flooding may be difficult to be identified. Nevertheless, in the SITL simulator, the neural network model M1 learns the epoch one more time, so that it can be seen that the heartbeat flooding may be accurately detected.

In the meantime, event after learning 90 or more epochs, it could be found that the heartbeat flooding was ambiguous to be identified in the SITL simulator in some cases of the heartbeat flooding, and it could be confirmed that the highest F1-score of 0.98 was achieved at 93 epochs.

In the meantime, in the present experiment, the neural network model M2 may be trained by using the attack-free set. As the verification set for measuring the prediction performance of the trained neural network model M2, 20% of the attack-free data set was randomly selected, and the result of the performance evaluation may be represented in Table 2 below. Herein, the blank of Table 2 may mean that a corresponding message type cannot be found in the corresponding simulation environment.

TABLE 2

| MAVLink message type (MSG ID) | SITL F1-score | SITL Count | HITL F1-score | HITL Count |
|---|---|---|---|---|
| HEARTBEAT | 0.96 | 126 | 0.76 | 111 |
| SYS_STATUS | 0.95 | 126 | 1.00 | 111 |
| SYSTEM_TIME | — | — | 0.96 | 110 |
| PING | 0.00 | 12 | 0.70 | 111 |
| GPS_RAW_INT | 0.97 | 126 | 0.90 | 2130 |
| SCALED_IMU | — | — | 0.97 | 2769 |
| ATTITUDE | 0.97 | 6302 | 1.00 | 5538 |
| ATTITUDE_QUATERNION | 0.99 | 6302 | 0.98 | 5538 |
| LOCAL_POSITION_NED | 0.98 | 6302 | 0.92 | 3323 |
| GLOBAL_POSITION_INT | 0.03 | 727 | 0.99 | 1108 |
| SERVO_OUTPUT_RAW | 0.99 | 6302 | 1.00 | 2215 |
| MISSION_CURRENT | — | — | 0.78 | 1047 |
| VFR_HUD | 0.93 | 504 | 0.94 | 2215 |
| ATTITUDE_TARGET | 0.98 | 6302 | — | — |
| POSITION_TARGET_LOCAL_NED | 0.99 | 6302 | — | — |
| POSITION_TARGET_GLOBAL_INT | — | — | 1.00 | 1108 |
| HIGHRES_IMU | — | — | 0.97 | 5538 |
| TIMESYNC | — | — | 1.00 | 1108 |
| ACTUATOR_CONTROL_TARGET | — | — | 0.99 | 3323 |
| ALTITUDE | 1.00 | 126 | 1.00 | 1107 |
| BATTERY_STATUS | 0.36 | 63 | 0.00 | 55 |
| ESTIMATOR_STATUS | 1.00 | 63 | 1.00 | 554 |
| VIBRATION | 1.00 | 12 | 1.00 | 554 |
| HOME_POSITION | 0.00 | 63 | 0.00 | 55 |
| EXTENDED_SYS_STATE | 0.75 | 126 | 0.78 | 221 |
| UTM_GLOBAL_POSITION | 0.06 | 63 | — | — |
| F1-score, total sample count | 0.96 | 39949 | 0.96 | 39949 |

Referring to Table 2, in both the SITL simulator and the HITL simulator, it can be seen that the F1-score (total sample count) of 0.96 is achieved. This may mean that the neural network model M2 almost perfectly predicts which message will arrive at the GCS next based on the given context MAVLink message.

Hereinafter, a result of the detection of false MAVLink injection attacks using the pre-trained neural network model M2 in the SITL simulator and the HITL simulator will be described.

(a) of FIG. 8 may be a result of an experiment using an SITL unmanned moving object simulator, and (b) of FIG. 8 may be a result of an experiment using an HITL unmanned moving object simulator. For the experiment, the data set may be input to the neural network model M2 in the order of time. As described above, it can be expected that the prediction accuracy of the attack-free data set is obviously very high. In the meantime, when a victim unmanned moving object is attacked, a concept drift of the message sequence occurs, so that the prediction accuracy may need to be low. In the present disclosure, the intrusion may be identified by applying a threshold to average prediction accuracy.

In particular, each line in (a) and (b) of FIG. 8 may represent the average accuracy of 100 message movements for a series of MAVLink messages. For example, a first line 610 may be average accuracy related to the attack-free packet, and a second line 620 may be average accuracy related to the heartbeat packet. A third line 630 may be average accuracy related to the ping packet, and a fourth line 640 may be average accuracy related to the request packet. Through (a) and (b) of FIG. 8, it is possible to confirm a difference between the attack-free data set and other data sets, and the usefulness of the neural network model M2 trained only with the attack-free data set may be demonstrated. Further, in the present experiment, the attacks could be identified by setting a detection threshold to 0.9 according to a heuristic manner.

The description of the presented exemplary embodiments is provided so as for those skilled in the art to use or carry out the present disclosure. Various modifications of the exemplary embodiments may be apparent to those skilled in the art, and general principles defined herein may be applied to other exemplary embodiments without departing from the scope of the present disclosure. Accordingly, the present disclosure is not limited to the exemplary embodiments suggested herein, and shall be interpreted within the broadest meaning range consistent with the principles and new characteristics presented herein.

What is claimed is:

1. A processor-implemented method of detecting anomaly of an unmanned moving object, the method comprising:
    collecting packet data generated in the unmanned moving object, the packet data being transceived via a communication protocol from the unmanned moving object;
    pre-processing the collected packet data;
    detecting an anomaly of the unmanned moving object based on a message ID pattern of the packet data by inputting the pre-processed packet data to a pre-trained neural network model, the pre-trained neural network model being pre-trained and configured to predict a message ID following a current message ID sequence of the packet data input to the pre-trained neural network model; and
    performing pre-defined missions, including at least one of a courier service, driving, surveillance, and military-related tasks, by controlling operations of the unmanned moving object based on a result of the detecting of the anomaly,
    wherein the pre-training of the neural network model includes:
    collecting normal packet data generated in a normal communication state of the unmanned moving object;
    pre-processing the collected normal packet data; and
    training the neural network model in a way of predicting a message ID following a current message ID sequence of the normal packet data by inputting the pre-processed normal packet data to the neural network model.

2. The method of claim 1, wherein the collecting packet data includes collecting the packet data generated in the unmanned moving object through communication between the unmanned moving object and a Ground Control System (GCS).

3. The method of claim 1, wherein the pre-processing the collected packet data includes:
    extracting a message ID from the collected packet data;
    assigning an integer value to the extracted message ID; and
    normalizing the integer value assigned to the message ID.

4. The method of claim 3, wherein the assigning an integer value to the extracted message ID includes assigning a different integer value according to a type of the message ID.

5. The method of claim 3, wherein the normalizing the integer value assigned to the message ID includes normalizing the integer value assigned to the message ID to a range of 0 to 1 in order to scale a size of the message ID.

6. The method of claim 3, wherein the normalizing the integer value assigned to the message ID includes, when the number of types of the message ID is a total of n, normalizing the integer value assigned to the message ID to a result value obtained by dividing the integer value assigned to each of the message ID by n.

7. The method of claim 1, wherein the detecting an anomaly of the unmanned moving object includes:
   inputting the pre-processed packet data to the pre-trained neural network model;
   predicting a message ID following a current message ID sequence of the packet data input to the neural network model;
   calculating a message ID pattern prediction success rate by comparing the predicted message ID and an actual message ID; and
   detecting an anomaly of the unmanned moving object based on the calculated message ID pattern prediction success rate.

8. The method of claim 7, wherein the calculating a message ID pattern prediction success rate includes:
   calculating an average value for message ID pattern prediction success rates for a predetermined period of time when the message ID pattern prediction success rate is calculated; and
   detecting an anomaly of the unmanned moving object by comparing the calculated average value for the message ID pattern prediction success rates with a predetermined threshold.

9. The method of claim 8, wherein the detecting an anomaly of the unmanned moving object includes determining that an anomaly of the unmanned moving object is detected when the calculated average value for the message ID pattern prediction success rates is smaller than the threshold.

10. The method of claim 1, wherein the detecting an anomaly of the unmanned moving object includes:
    inputting the pre-processed packet data to the pre-trained neural network model;
    predicting a message ID following a current message ID sequence of the packet data input to the neural network model;
    calculating a message ID pattern loss value by comparing the predicted message ID and an actual message ID; and
    detecting an anomaly of the unmanned moving object based on the calculated message ID pattern loss value.

11. The method of claim 10, wherein the calculating of the message ID pattern loss value includes:
    calculating an average value for message ID pattern loss values for a predetermined period of time when the message ID pattern loss value is calculated; and
    detecting the anomaly of an unmanned moving object by comparing the calculated average value for the message ID pattern loss values with a predetermined threshold.

12. The method of claim 11, wherein the detecting of an anomaly of the unmanned moving object includes determining that the anomaly of an unmanned moving object is detected when the calculated average value for the message ID pattern loss values is larger than the threshold value.

13. A non-transitory computer readable medium storing a computer program, wherein the computer program performs the following method for detecting anomaly of an unmanned moving object when executed by one or more processors, the method comprising:
    collecting packet data generated in the unmanned moving object, the packet data being transceived via a communication protocol from the unmanned moving object;
    pre-processing the collected packet data;
    detecting an anomaly of the unmanned moving object based on a message ID pattern of the packet data by inputting the pre-processed packet data to a pre-trained neural network model, the pre-trained neural network model being trained and configured to predict a message ID following a current message ID sequence of the packet data input to the pre-trained neural network model; and
    performing pre-defined missions, including at least one of a courier service, driving, surveillance, and military-related tasks, by controlling operations of the unmanned moving object based on a result of the detecting of the anomaly,
    wherein the pre-training of the neural network model includes:
    collecting normal packet data generated in a normal communication state of the unmanned moving object;
    pre-processing the collected normal packet data; and
    training the neural network model in a way of predicting a message ID following a current message ID sequence of the normal packet data by inputting the pre-processed normal packet data to the neural network model.

14. A computing device for providing a method of detecting an anomaly of an unmanned moving object, the computing device comprising:
    a processor including one or more cores; and
    a memory,
    wherein the processor is configured to collect packet data generated in the unmanned moving object, the packet data being transceived via a communication protocol from the unmanned moving object,
    pre-process the collected packet data,
    detect an anomaly of the unmanned moving object based on a message ID pattern of the packet data by inputting the pre-processed packet data to a pre-trained neural network model, the pre-trained neural network model being trained and configured to predict a message ID following a current message ID sequence of the packet data input to the pre-trained neural network model, and
    perform pre-defined missions, including at least one of a courier service, driving, surveillance, and military-related tasks, by controlling operations of the unmanned moving object based on a result of the detecting of the anomaly,
    wherein, for the pre-training of the neural network model, the processor is configured to:
    collect normal packet data generated in a normal communication state of the unmanned moving object;
    pre-process the collected normal packet data; and
    train the neural network model in a way of predicting a message ID following a current message ID sequence of the normal packet data by inputting the pre-processed normal packet data to the neural network model.

15. The computing device of claim 14, wherein, for the detecting an anomaly of the unmanned moving object, the processor is further configured to:
    input the pre-processed packet data to the pre-trained neural network model;
    predict a message ID following a current message ID sequence of the packet data input to the neural network model;
    calculate a message ID pattern prediction success rate by comparing the predicted message ID and an actual message ID; and
    detect an anomaly of the unmanned moving object based on the calculated message ID pattern prediction success rate.

16. The computing device of claim 15, wherein, for the calculating a message ID pattern prediction success rate, the processor is further configured to:
- calculate an average value for message ID pattern prediction success rates for a predetermined period of time when the message ID pattern prediction success rate is calculated; and
- detect an anomaly of the unmanned moving object by comparing the calculated average value for the message ID pattern prediction success rates with a predetermined threshold.

17. The computing device of claim 16, wherein, for the detecting an anomaly of the unmanned moving object, the processor is further configured to determine that an anomaly of the unmanned moving object is detected when the calculated average value for the message ID pattern prediction success rates is smaller than the threshold.

18. The computing device of claim 14, wherein, for the detecting an anomaly of the unmanned moving object, the processor is further configured to:
- input the pre-processed packet data to the pre-trained neural network model;
- predict a message ID following a current message ID sequence of the packet data input to the neural network model;
- calculate a message ID pattern loss value by comparing the predicted message ID and an actual message ID; and
- detect an anomaly of the unmanned moving object based on the calculated message ID pattern loss value.

19. The computing device of claim 18, wherein, for the calculating of the message ID pattern loss value, the processor is further configured to:
- calculate an average value for message ID pattern loss values for a predetermined period of time when the message ID pattern loss value is calculated; and
- detect the anomaly of an unmanned moving object by comparing the calculated average value for the message ID pattern loss values with a predetermined threshold.

* * * * *